May 30, 1950

A. E. KROGH 2,509,827

CONTROL SYSTEM

Filed April 8, 1948

INVENTOR.
ANKER E. KROGH

BY Arthur H. Swanson

ATTORNEY

Patented May 30, 1950

2,509,827

UNITED STATES PATENT OFFICE 2,509,827

CONTROL SYSTEM

Anker E. Krogh, Glenside, Pa., assignor, by mesne assignments, to Minneapolis-Honeywell Regulator Company, Minneapolis, Minn., a corporation of Delaware Application April 8, 1948, Serial No. 19,739

5 Claims. (Cl. 219—20)

1

The present invention relates in general to the provision of improved electric control apparatus.

More specifically the object of this invention is to provide improved electric control apparatus comprising a measuring instrument responsive to a controlling quantity, value or other condition, an electric motor having one coil connected under the control of said measuring instrument, an electric switch driven by said motor and controlling the connection of another coil of said motor to a source of power, said coils (when simultaneously energized) serving to stall the motor, and a final control element, such as an electric relay, connected in parallel with the second coil of said motor and in series with the electric switch so as to be controlled by the motor-driven electric switch.

More specifically still the object of the present invention is to provide electric control apparatus which may be employed as a relay between an electric contact making and breaking device, which is actuated by a condition to be controlled, and an electric switch which controls the supply of power to the apparatus to be controlled. This control system has simple and effective means for adjusting it for desirable operation under this condition of use.

It is yet another object of this invention to provide a control system which will actuate a final control element positively and exactly in response to the movements of a measuring instrument and without "chattering" or sticking of electric contacts due to the slow or small movement of the measuring instrument.

The various features of novelty which characterize my invention are pointed out with particularity in the claims annexed to and forming a part of this specification. For a better understanding of the invention, however, its advantages, and specific objects attained by its use, reference should be had to the accompanying drawings and descriptive matter in which I have illustrated and described preferred embodiments of the invention.

Figure 1:
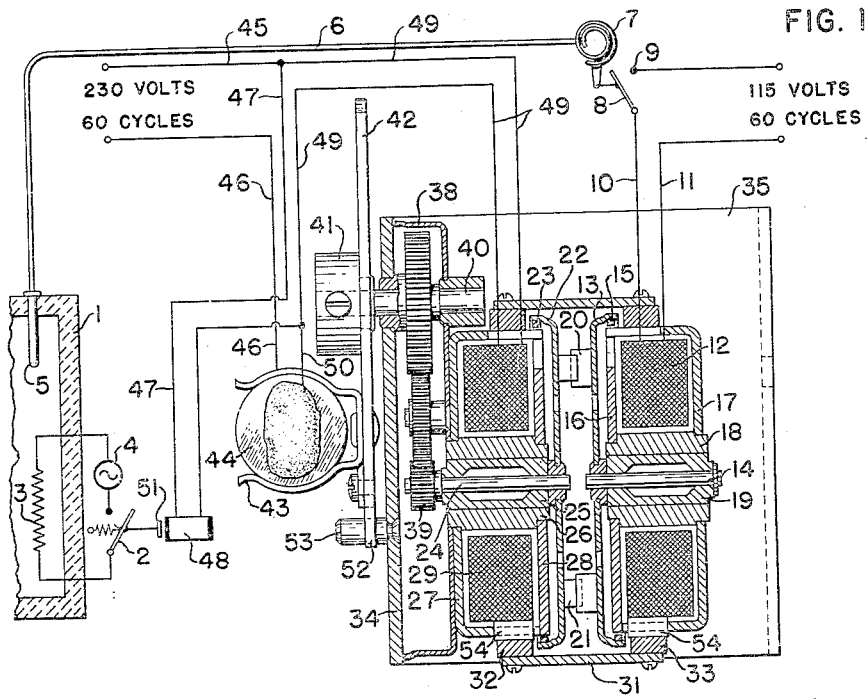
Fig. 1 is a schematic showing containing an electric circuit diagram and a longitudinal cross section through the electric motor.
Figure 2:
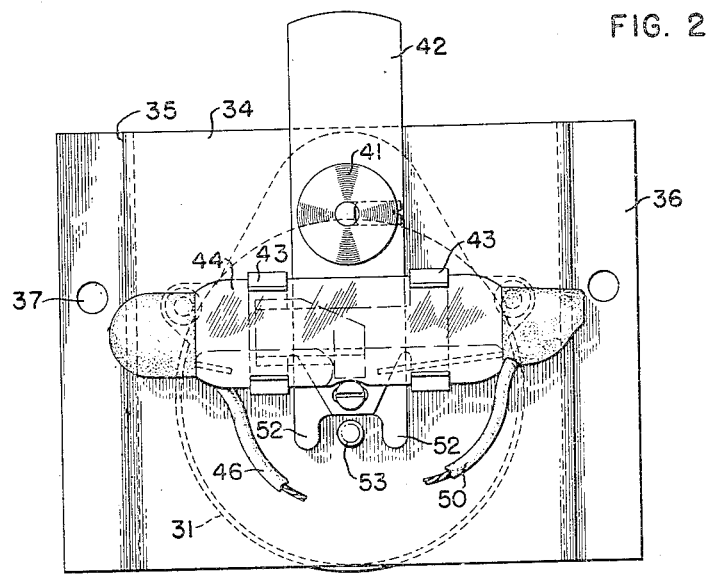
Fig. 2 is a front elevation of the electric motor and the mercury switch driven thereby.

In the embodiment of the invention diagrammatically illustrated in Fig. 1 the heat supply in a furnace 1 is regulated by adjustment of electric switch 2 which controls the connection of

2 the furnace heater or resistor 3 to a source of electricity 4. It is desired to adjust the heater 3 automatically in response to variations in the furnace temperature, as may be required to maintain the furnace temperature approximately constant. The furnace temperature is measured by means shown diagrammatically as comprising the bulb 5 of a fluid pressure type thermometer which is connected by means of a capillary tube 6 to a measuring instrument, including an actuating element in the form of arc shaped Bourdon tube 7 to which the pressure of the thermometer bulb 5 is transmitted.

On an increase or decrease in the furnace temperature, the resultant flexure of the Bourdon tube 7 moves an electric switch contact 8 into or out of engagement with its cooperating stationary switch contact 9. The electric switch 8—9 is connected in series with the leads 10—11 to a source of electricity which may conveniently be a commercially available source of electricity at 115 volts at 60 cycles.

The leads 10—11 connect to one coil 12 of an electric motor of the self-starting, hysteresis type. In this form of motor some of the pole tips will be arranged a considerable distance apart, the remaining pole tips being close together if not in actual contact. Some of the pole tips are surrounded by shading coils 54 which are simply rings of copper or other metal of good electric conductivity. The rotor member 13 is mounted on a shaft 14. This rotor member may be in the form of a spider of aluminum or other light metal supporting a continuous ring shaped armature 15. The armature 15 is preferably made of hardened steel (or other material having a high hysteresis coefficient) so that it offers considerable resistance to any attempt to change the magnetism of the armature.

The rotor armature 15 is mounted in close proximity to two sets of field pole pieces 16 and 17 which are carried by a perforated tubular portion 18 in which is mounted a bearing 19 for the shaft 14.

Coil 12, of insulated magnetic wire is enclosed between the sections 16, 17 and 18 of the field casing. Single phase alternating current may be supplied to coil 12 from a suitable source through leads 10 and 11. The radial portions of the field sections 16 and 17 are located on opposite sides of the coil and accordingly, at any given instant, are magnetized in such a way that they are of opposite polarity. Therefore alternating pole pieces are of opposite polarity at any given instant and, due to the fact that the electricity supplied to the coil 12 is an alternating current, the polarity of each pole piece alternates in synchronism with the current. The magnetic flux due to the pole pieces which are surrounded by a shading coil 54 lags or is changed in phase behind the corresponding magnetic flux due to the unshaded pole pieces. The operation of the motor may be briefly summarized as follows:

The armature 15 will rotate in relatively low speed and the polarity of any given section of the armature 15 will be changed by the flux change which occurs at a slow rate due to the high hysteresis coefficient of the armature. The effect is to produce a field in the armature lagging behind the primary field in the field section to such an extent that the reaction of the two fields produces a positive torque. After synchronous speed is reached, then each portion of the rotor armature 15 possesses a fixed polarity. The motor then operates as a synchronous motor and the speed of rotation is that determined by the frequency of the supply current and a number of field poles. It will be understood that the larger the number of poles the lower the synchronous speed. It is desirable to have two or more pairs of poles and it is feasible to have 24 poles or even a larger number. With a given field, the eddy currents induced in the rotor can be reduced by increasing the number of poles. This is desirable because the eddy currents produce a negative torque in the motor which opposes the normal hysteresis torque.

The rotar spider 13 bears on it a pair of projecting dogs or teeth 20. These engage with a pair of projecting dogs or teeth 21 on a second rotor 22 which bears an armature 23 on it. Rotar 22 is mounted on a shaft 24 on a bearing 25 supporting tube 26 on which are mounted field sections 27 and 28 surrounding a motor coil 29. Parts 22-29 form a second motor substantially identical with the motor just described and therefore will be readily understood without further explanation. A tubular casing 31 supports rings 32 and 33 which carry the field sections 27 and 17 respectively.

The entire motor may conveniently be mounted in a control casing or other suitable locations by means of a bracket 34 having a pair of rearwardly extending arms 35 each provided at its rearend with a flange 36 containing perforation 37 for connection to a suitable support. A housing 38 is fastened to the rear face of bracket 34 and in turn supports the motor by the engagement between housing 38 and the field section 27.

Shaft 24 carries at one end one of a train of gears 39. The end gear of the train 39 is passed on a shaft 40 mounted on suitable bearings in bracket 34 and in housing 38. Secure to the end of shaft 40, by means of a collar 41, is a plate 42 bearing clips or fingers 43 in which is mounted a mercury switch generally indicated at 44. At its lower end plate 42 has on it projecting finger 52 which cooperates with a stationary stop 53 secured to bracket 34.

Leads 45 and 46 connected to the opposite sides of a source of electricity conveniently a commercially available source of 230 volts at 60 cycles. Lead 46 connects directly to mercury switch 44 while lead 45 branches, wire 47 connecting relay coil 48 in parallel with lead 49 containing motor coil 29. Leads 47 and 49 connect at their opposite ends with lead 50 connected at its opposite end to mercury switch 44. Cooperating with relay coil 48 is a relay armature 51 having mechanical connections with switch 2 to open and close switch 2 as the relay coil is energized or deenergized.

The operation of the control system of this invention is as follows:

When the temperature of the furnace 1 falls below the temperature to which it is desired to be maintained, the thermometer bulb 5 transmits fluid pressure through capillary 6 to Bourdon tube 7 thereby closing switch contact 8 against its stationary contact 9. Closing switch contacts 8—9 causes current through leads 10 and 11 to energize coil 12. This causes rotation of rotor 13 by means of its armature 15. Dogs 20 engage dogs 21 thereby causing rotation of rotor 22, shaft 24, gear train 39, shaft 40, plate 42, and mercury switch 44 mounted thereon. This rotation tends to turn mercury switch 44 towards the position in which the mercury in it closes circuit through its contacts. Closure of the contacts of mercury switch 44 energizes coil 29 thereby stopping or stalling the motor. Simultaneously relay coil 48 is energized to make circuit from source 4 to the furnace heater 3. This making of the contacts of switch 2 takes place without any "chattering" which might cause arcing and consequently sticking or welding of the contacts of switch 2. It is thus providing a very sensitive control since a small movement of Bourdon tube 7 causes contact 8 to engage stationary contact 9 and to set in train the events just specified. If the furnace should heat up, the pressure transmitted from bulb 5 will cause Bourdon tube 7 to open switch contacts 8—9. Coil 12 is thus deenergized. However coil 29 remains energized because switch 44 is closed. Consequently the motor turns in the opposite direction until switch 44 opens, thereby deenergizing coil 29 and simultaneously deenergizing furnace heater 3.

It is very difficult to balance the torque due to coil 12 so that the motor stalls or stops. It may be preferable to insure that coil 12 has a greater torque than coil 29. In such case, even after switch 44 closes and coil 29 is energized the motor may not stall. It may continue to move at a greatly reduced speed until one of the fingers 52 engages the stop or pin 53. When the finger 52 engages the pin 53 the rotor of the motor will slip regardless of any differential torque between the torque due to coils 12 and 29.

It will be appreciated that numerous modifications of this device are possible. One obvious modification is to combine the shafts 14 and 24 into one. In such case but one rotor could be employed to cooperate with both coils 12 and 29. Another modification is to connect the dogs 20 and 21 in the form of wires having some flexibility and extending substantially radially of the respective rotors.

While in accordance with the provisions of the statutes, we have illustrated and described the best forms of the invention now known to us, it will be apparent to those skilled in the art that changes may be made in the form of the apparatus disclosed without departing from the spirit of the invention as set forth in the appended claims, and that in some cases certain features of the invention may sometimes be used to advantage without a corresponding use of other features.

Having now described my invention what I claim as new and desire to secure by Letters Patent is as follows:

1. In a system for controlling the supply of power to a power-consuming device, a measuring instrument responsive to a condition with regard to which it is desired to control the power-consuming device, a motor having an output member and a first part causing forward movement of the motor and a second part causing reverse movement of the motor, said first and second parts (when simultaneously energized) causing stopping of the output member of the motor, a first circuit-maker-and-breaker connected under the control of said measuring instrument and controlling the connection and disconnection of a supply of power to one of said parts of said motor, a second circuit-maker-and-breaker mounted so as to be driven to circuit-making position or to circuit-breaking position by the output member of said motor and controlling the connection and disconnection of a supply of power to the other part of the motor, and a device controlling the supply of power to the power-consuming device and connected under the control of said second circuit-maker-and-breaker.

2. In a system for controlling the supply of power to a power-consuming device, a measuring instrument responsive to a condition with regard to which it is desired to control the power-consuming device, an electric motor having an output member and a first coil causing forward movement of the motor and a second coil causing reverse movement of the motor, said first and second coils (when simultaneously energized) causing stopping of the output member of the motor, a first electric switch connected under the control of said measuring instrument and controlling the connection and disconnection of a supply of electricity to one of said coils of said motor, a second electric switch mounted so as to be driven to circuit-making or to circuit-breaking position by the output member of said motor and controlling the connection and disconnection of a supply of electricity to the other coil of the motor, and a device controlling the supply of power to the power-consuming device and connected under the control of said second electric switch.

3. In a controlling system, the combination with an electric motor having two windings and adapted to operate in one direction or the other accordingly as one or the other of said windings is energized and to stall when both windings are energized, of industrial process controlling means including, a first switch responsive to changes in a controlling condition and adapted to start said motor into operation by energizing one of said windings upon a change in said condition, a motor-driven switch to interrupt the operation of said motor by energizing the winding not previously energized, and a second motor for operating a device controlling the supply of power to the industrial process, said second motor being connected in parallel with that motor winding which is under the control of said motor-driven switch.

4. In a controlling system, the combination with a normally deenergized electric motor having two windings and adapted to operate in one direction or the other accordingly as one or the other of said windings is energized and to stall when both windings are simultaneously energized, industrial process controlling means including, a switch having a plurality of positions and adapted to be selectively actuated from one of its positions in which both of said windings are deenergized into another of its positions responsively to changes in a controlling condition and adapted to energize one of said windings in its said other position, thereby starting said motor into operation in one direction, a second switch driven by said motor to energize the other of said windings and to thereby positively interrupt the operation of said motor, and a device controlling the supply of power to the industrial process and connected in parallel with said other winding of said motor and in series with said second switch so as to be controlled by said second switch.

5. In a control system for supplying power to an electric furnace, a thermometer responsive to the temperature of the furnace to be controlled, an electric switch operated by said thermometer, an electric motor having a pair of coils and adapted to move in one direction when one of said coils is energized and to move in the opposite direction when the other of said coils is energized and to stall when both of said coils are simultaneously energized, one of said coils being connected to and disconnected from a source of electricity under the control of said switch, a bracket mounting said motor, a mercury switch pivotally mounted on said bracket and driven by said motor in switch-closing or in switch-opening direction, and circuit connections with a source of electricity into which circuit connections the second coil of said motor and the coil of an electric relay controlling the supply of power to said furnace are connected in parallel or disconnected by said mercury switch.

ANKER E. KROGH.

REFERENCES CITED

The following references are of record in the file of this patent:

UNITED STATES PATENTS

| Number | Name | Date |
|---|---|---|
| Re. 16,810 | Thurston | Dec. 6, 1927 |
| 774,728 | Clark | Nov. 8, 1904 |
| 1,715,750 | Gano | June 4, 1929 |
| 1,991,248 | Hartigan | Feb. 12, 1935 |
| 2,105,883 | George | Jan. 18, 1938 |
| 2,149,729 | Finch | Mar. 7, 1939 |
| 2,153,222 | Wunsch | Apr. 4, 1939 |
| 2,430,367 | Pudelko et al. | Nov. 4, 1947 |